United States Patent [19]
Droste et al.

[11] Patent Number: 6,158,786
[45] Date of Patent: Dec. 12, 2000

[54] LATCH FOR A TOP OF A VEHICLE, ESPECIALLY AN AUTOMOBILE

[75] Inventors: Hans Droste; Dieter Bauer, both of Leonberg; Wolfgang Moebius, Schwieberdingen; Reiner Armbruster, Alpirsbach; Kurt Pfertner, Wimsheim, all of Germany

[73] Assignee: Dr. Ing. h.c.f. Porsche AG, Weissach, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/081,870

[22] Filed: May 21, 1998

[30] Foreign Application Priority Data

May 21, 1997 [DE] Germany .............. 197 21 229

[51] Int. Cl.⁷ .................................. E05C 3/06
[52] U.S. Cl. ..................... 292/201; 292/DIG. 5
[58] Field of Search ............... 292/200, DIG. 5, 292/144, 201, 199, 196; 70/279.1, 465

[56] References Cited

U.S. PATENT DOCUMENTS

| | | | |
|---|---|---|---|
| 2,233,353 | 2/1941 | Ter Meer et al. | 70/465 |
| 4,484,766 | 11/1984 | Buchmeier | 280/808 |
| 4,821,521 | 4/1989 | Schuler | 60/716 |
| 4,830,426 | 5/1989 | Schlachter et al. | 296/121 |
| 5,058,939 | 10/1991 | Miilu | 292/110 |
| 5,154,479 | 10/1992 | Sautter, Jr. | 296/121 |
| 5,284,378 | 2/1994 | Sautter, Jr. | 296/224 |
| 5,472,065 | 12/1995 | Vergin | 185/40 R |
| 5,547,234 | 8/1996 | Kinnanen | 292/25 |
| 5,628,535 | 5/1997 | Buscher et al. | 292/201 |
| 5,639,130 | 6/1997 | Rogers, Jr. et al. | 292/216 |
| 5,678,881 | 10/1997 | Tokarz | 296/121 |
| 5,755,467 | 5/1998 | Dilluvio et al. | 292/32 |
| 5,791,172 | 8/1998 | Deighton et al. | 70/63 |

FOREIGN PATENT DOCUMENTS

| | | |
|---|---|---|
| 0 488 494 | 6/1992 | European Pat. Off. . |
| 2 562 480 | 10/1985 | France . |
| 34 13 379 A1 | 10/1985 | Germany . |
| 37 15 764 A1 | 11/1988 | Germany . |
| 195 33 802 C1 | 3/1997 | Germany . |
| 196 02 185 | 4/1997 | Germany . |
| 196 02 185 C1 | 4/1997 | Germany . |

Primary Examiner—B. Dayoan
Assistant Examiner—Clifford B Vaterlaus
Attorney, Agent, or Firm—Evenson, McKeown, Edwards & Lenahan, P.L.L.C.

[57] ABSTRACT

A latch for a top of an automobile has a housing mounted on the top with a movable latching hook cooperating with a link mounted on the windshield frame. The latching hook is displaceable by an actuating device from a closed position into an open position. To produce a latch which forms a compact module, takes up little space in the transverse vehicle direction, and whose latching hook is movable by a motor, the motorized actuating device for the latching hook has a drive motor aligned approximately parallel to the lengthwise direction of the latching hook. The motor is in an operating relationship through a transverse transmission element and a downstream transmission with a drive lever to move the latching hook.

15 Claims, 9 Drawing Sheets

LATCH FOR A TOP OF A VEHICLE, ESPECIALLY AN AUTOMOBILE

BACKGROUND AND SUMMARY OF THE INVENTION

This application claims the priority of German application 197 21 229.8 filed in Germany on May 21, 1997, the disclosure of which is expressly incorporated by reference herein.

The present invention relates to a latch for a top of a vehicle, especially an automobile, and more particularly to a latch being tensioned against a fixed frame of a body, with the latch comprising a housing on the top that has a movable latching hook, said hook cooperating with a link mounted on the frame and being displaceable from a closed position into an open position by an actuating device.

Unpublished German patent application file no. 196 02 185.5-21 describes a latch which has good functioning and is located approximately centrally in the transverse direction of the vehicle. The latch is intended for a top of an automobile, with the latching hook, which is elongate and extends in the lengthwise direction of the vehicle, is manually operable.

By actuating a central pushbutton, the pivotably mounted handle of the latch is moved into a lowered gripping position. As a result of subsequent pivoting of the handle, the latching hook is moved into the open position in which it is disengaged from the link on the windshield frame.

An object of the present invention is to provide an improved latch in which the latching hook is movable by a motor, and the latch forming a compact module takes up little space, especially in the transverse direction of the vehicle.

According to the present invention, this object has been achieved by providing a latch in which a motorized actuating device for a latching hook has a drive motor aligned approximately parallel to the lengthwise direction of the latching hook. The motor is in an operative relationship through a transverse transmission element and a downstream transmission with a drive lever which moves the latching hook.

The primary advantages achieved with the present invention include the fact that, as a result of the approximately parallel alignment of the drive motor with respect to the latching hook that runs in the lengthwise direction of the vehicle, a compact motorized latch which consumes very little space especially in the transverse direction of the vehicle is provided for a top.

All elements of the motorized latch can be fastened to the housing and form a prefabricated module which can be mounted in a simple manner on the front, dimensionally stable portion of the top. A two-stage transmission located in between and a relatively small drive motor allow high forces to be transmitted to the latching hook through the traversely arranged transmission element.

A manual emergency operating mechanism for the latching hook is located in between and has a simple configuration. A spring-loaded locking pawl, in a locking position of the latching hook, engages the drive lever from above and blocks the latter, additionally securing the latching hook against vibration, twisting, or the like.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
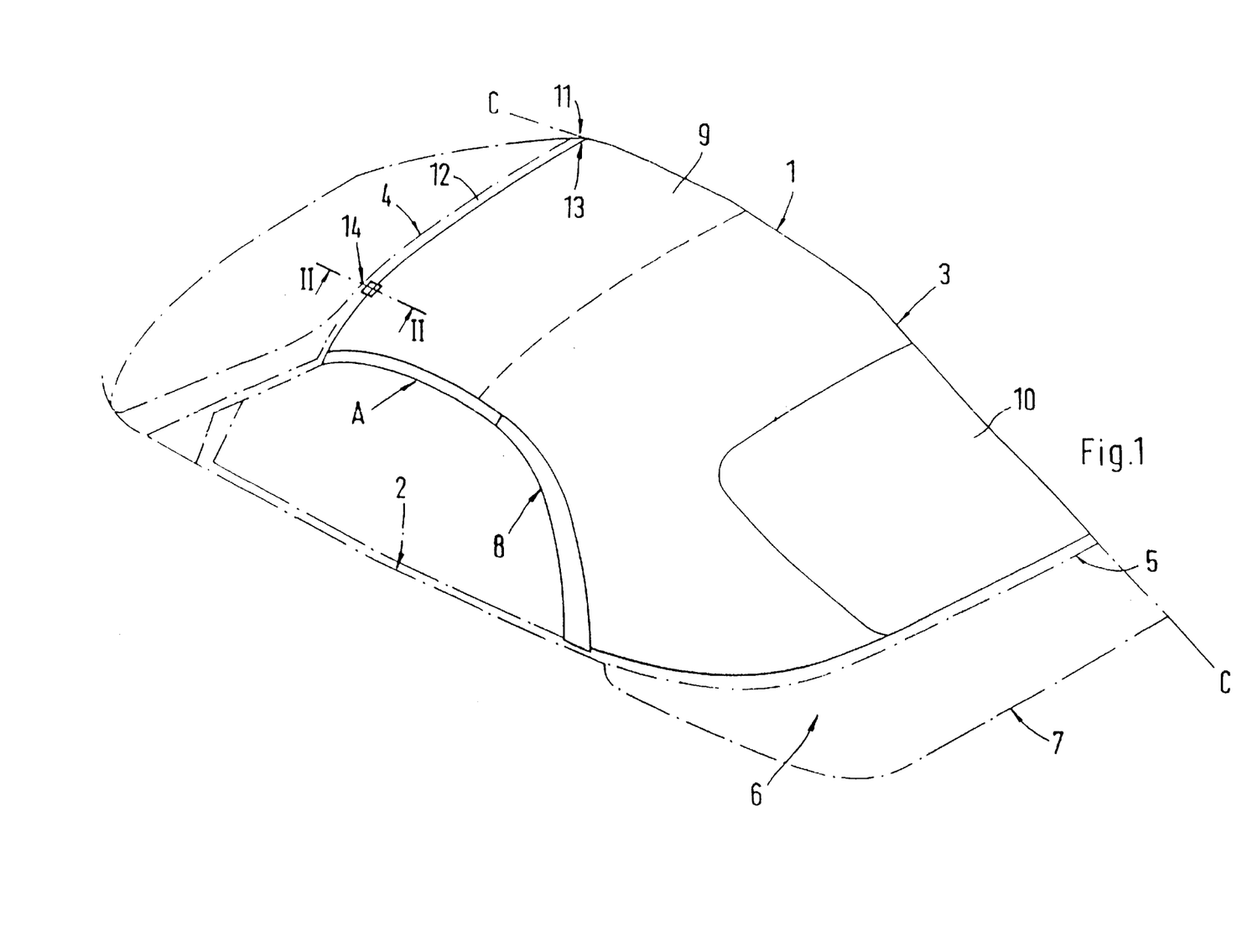
FIG. 1 is a partial perspective view, diagonally from the rear of a vehicle with a top in the closed position.

In FIG. 1 the shown partial area of an automobile 1 has a top 3 above a belt line 2. The top 3 in the embodiment extends in its closed position A between a frame 4 on the body, formed by a windshield frame and a rear area 5. In the rear area 5, a storage compartment 6 is covered at least partially on top by a lid 7. The top 3, which can be shifted from a closed position A into a rear stored position B and back again, is formed by a folding top composed of a top frame 8 pivotably articulated to the body and an elastic top covering 9 that is held in place on top frame 8. A window 10 is provided in the rear area of top covering 9, said window being formed by a flexible or rigid rear window pane. The top 3 is held by a releasable locking device 11 on an upper transverse area 12 of frame 4 on the body in its closed position A.

Figure 2:
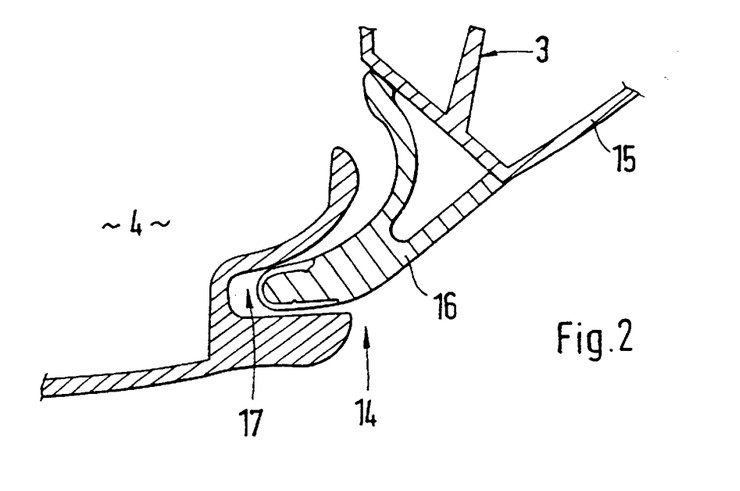
FIG. 2 is a sectional view along line II—II in FIG. 1 on an enlarged scale, showing a lateral centering device.

The locking device 11 comprises a central latch 13 located in the vicinity of a lengthwise central plane C-C of the vehicle, and two laterally external centering devices 14. However, two spaced latches 13 can also be used instead. The two centering devices 14 secure the top 3 in the transverse and vertical directions of the vehicle as seen in FIG. 2. Each centering device 14 comprises a centering element 16 located on a forward dimensionally stable top frame 15. The element 16, with top 3 in the closed position A, cooperates with a receptacle 17 mounted on the frame 4. The centering element 16 is mounted on top frame 15. The dimensionally stable front top frame 15 of top 3 is formed by a cast part with a large area made of a lightweight metal alloy such aluminum or magnesium alloy and the like.

Figure 3:
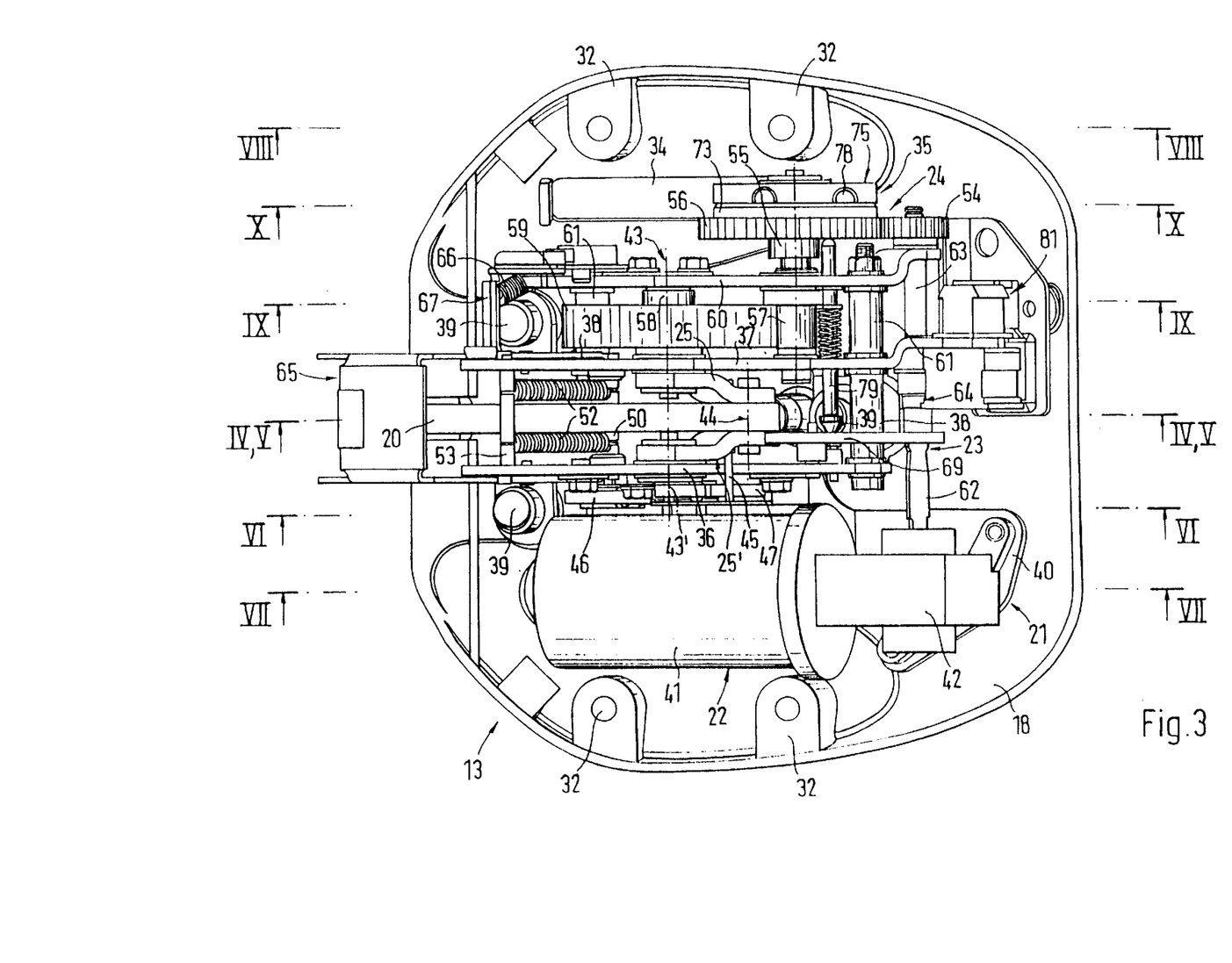
FIG. 3 is a top view of the central latch under motor control.

The latch 13, configured as a bell crank latch and shown in FIG. 3, essentially includes a housing 18 mounted on the underside of the dimensionally stable forward top frame 15, a latching hook 20 which in its locking position D is in an operating relationship with a link 19 mounted on frame 4, and a motorized actuating device 21 for the adjusting movement of latching hook 20. The latch 13 tensions the top 3 in the lengthwise direction and forward against the fixed frame 4.

Figure 12:
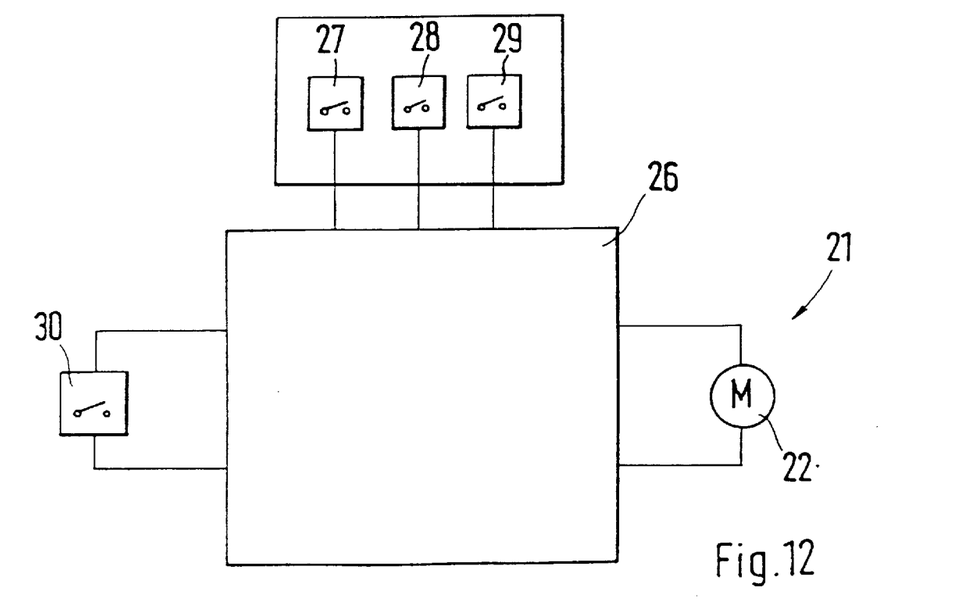
FIG. 12 is a schematic diagram of a circuit for operating an actuating device of the latch.

The motorized actuating device 21 includes a drive motor 22 which extends approximately parallel and with a lengthwise separation relative to the lengthwise extent of elongate latching hook 20. The motor 22 is in an operating relationship through a transverse transmission element 23 and a transmission 24 located downstream with at least one drive lever 25, 25' which moves latching hook 20. The motorized actuating device 21 can be put into operation by a control device 26 which receives various signals from monitoring contacts 27, 28, 29 and an actuating switch 30 operable by a vehicle occupant in association with the circuit shown in (FIG. 12). The latch 13 is prevented from opening by self-locking in the transmission as well as a latching hook position which occurs about 15° after top dead center.

Figure 8:
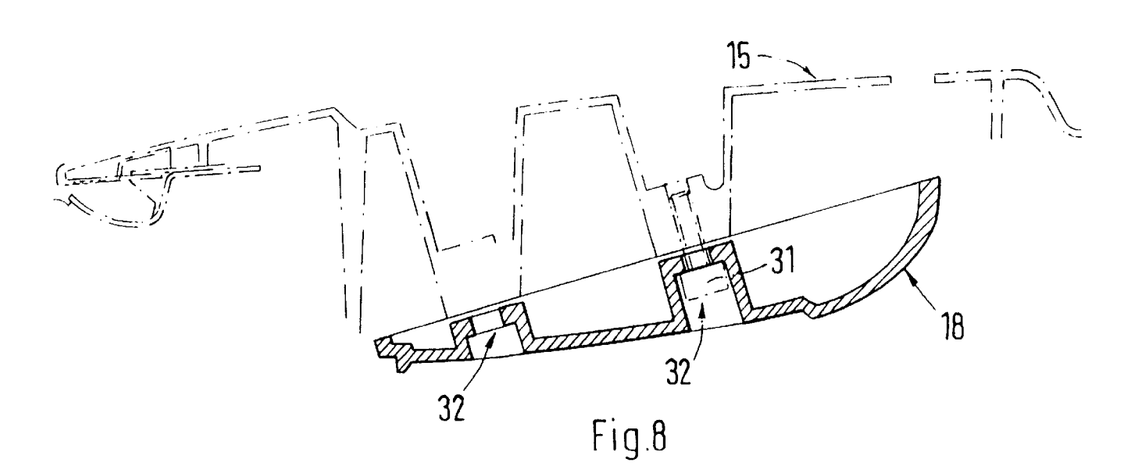
FIG. 8 is a sectional view along line VIII—VIII in FIG. 3.
Figure 10:
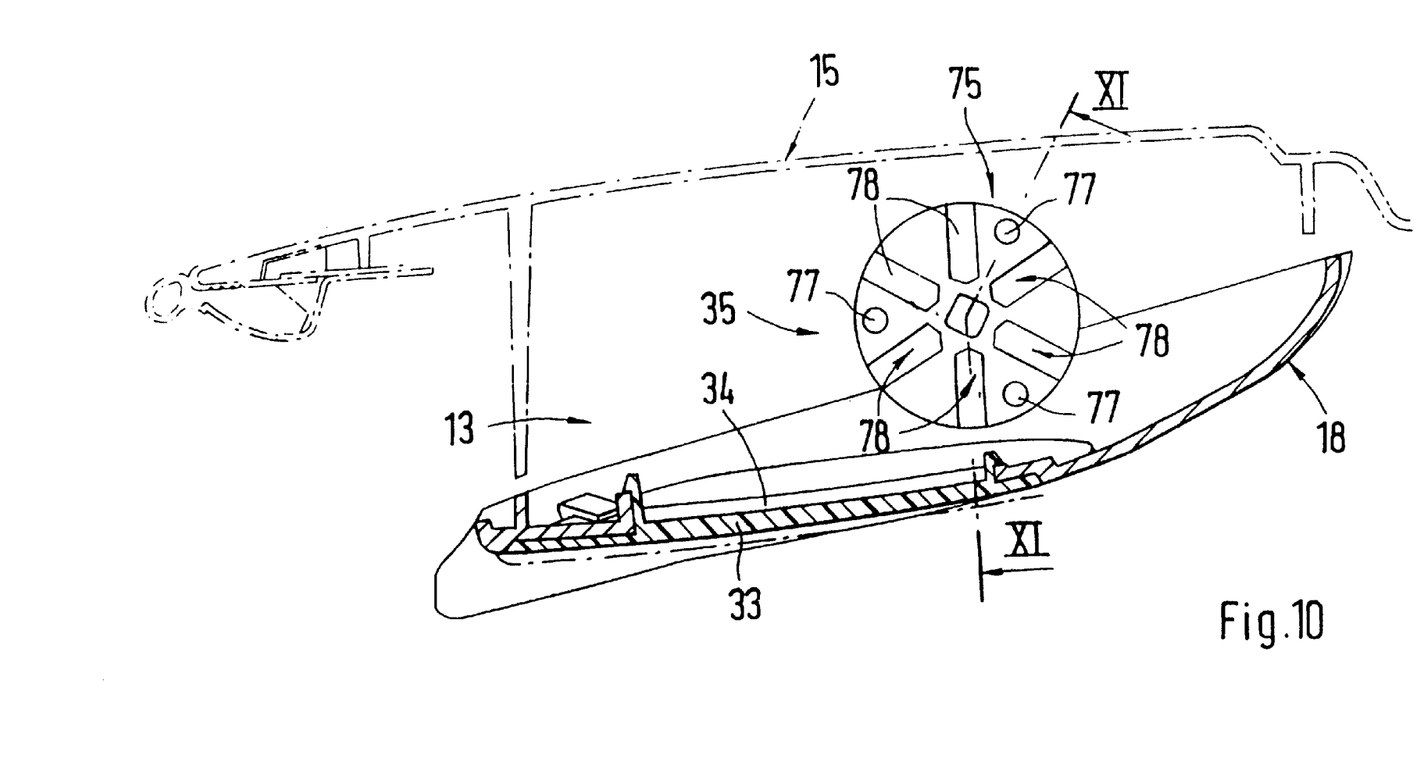
FIG. 10 is a sectional view along line X—X in FIG. 3.
Figure 11:
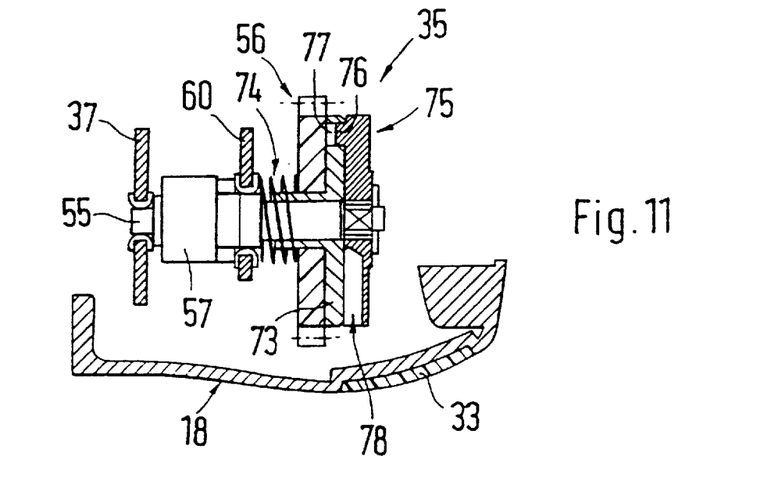
FIG. 11 is a sectional view along line XI—XI in FIG. 10.

The housing 18 is held in place on its two lengthwise sides by mounting screws 31 on the dimensionally stable top frame 15 located thereabove. For this purpose, two depressed receptacles 32 spaced apart from one another as seen in FIG. 8 are provided on the underside of the housing 18 on each lengthwise side. The mounting screws 31, which are tightened from below, are concealed from the passenger compartment by plastic covers 33 which can be clipped into housing 18. In addition, elongated slot openings 34 are provided on the housing 18 as seen in FIG. 10, further inside next to the mounting screws 31, through which openings 34, with plastic covers 33 removed, an auxiliary tool for manual emergency operation 35 of motorized latch 13 can be introduced.

On the side of the housing 18 which faces the dimensionally stable top frame 15, two spaced bearing blocks 36, 37 are mounted and directed lengthwise. The blocks 36, 37 are held at a fixed distance from one another by locally provided transverse spacing elements 38. Both bearing blocks 36, 37 are held in place on the housing 18 located beneath by screwable fastening elements 39. The upright bearing block 36 has a horizontal plate-shaped offset 40 on its lower edge to which the drive motor 22 can be secured.

Figure 7:
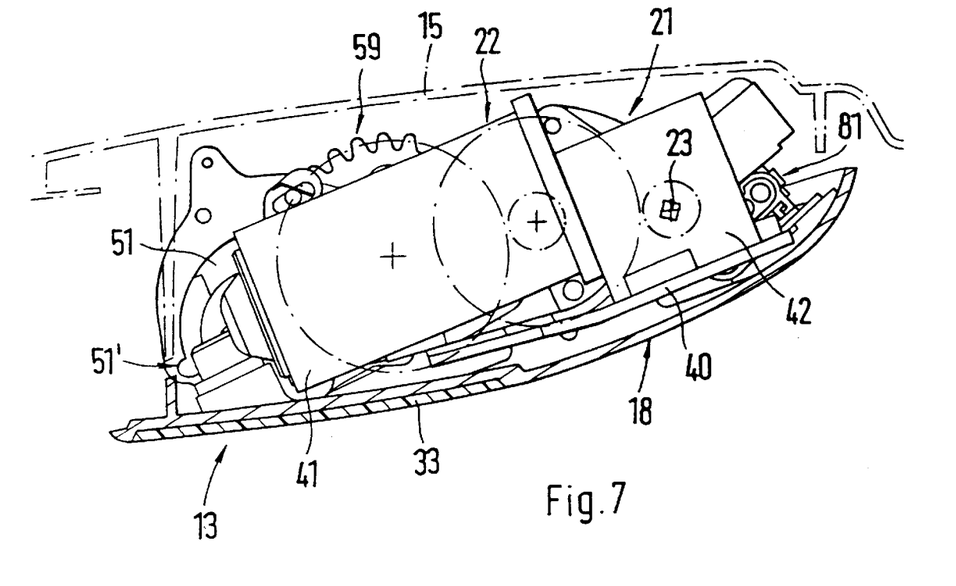
FIG. 7 is a sectional view along line VII—VII in FIG. 3.

The drive motor 22 includes an electric motor 41 and a flanged worm drive 42 having an angle drive in an operating relationship with transmission element 23 that extends approximately perpendicularly with respect to electric motor 41 as seen in FIG. 7. One end of the drive lever 25, 25' is rotatably mounted on each of upright bearing blocks 36, 37 (flush fixed rotational axes 43, 43'). The other ends of the two spaced drive levers 25, 25' are rotatably connected with the rear edge of the latching hook 20 (rotational axis 44). Both drive levers 25, 25' have a transverse switching pin 45, with a free projecting end of the switch pin 45, depending on the end position of the latching hook 20, cooperating with an associated end position switch 46, 47. Both end position switches 46, 47 are located on the sides of adjoining bearing blocks 36 which face drive motor 22.

Figure 4:
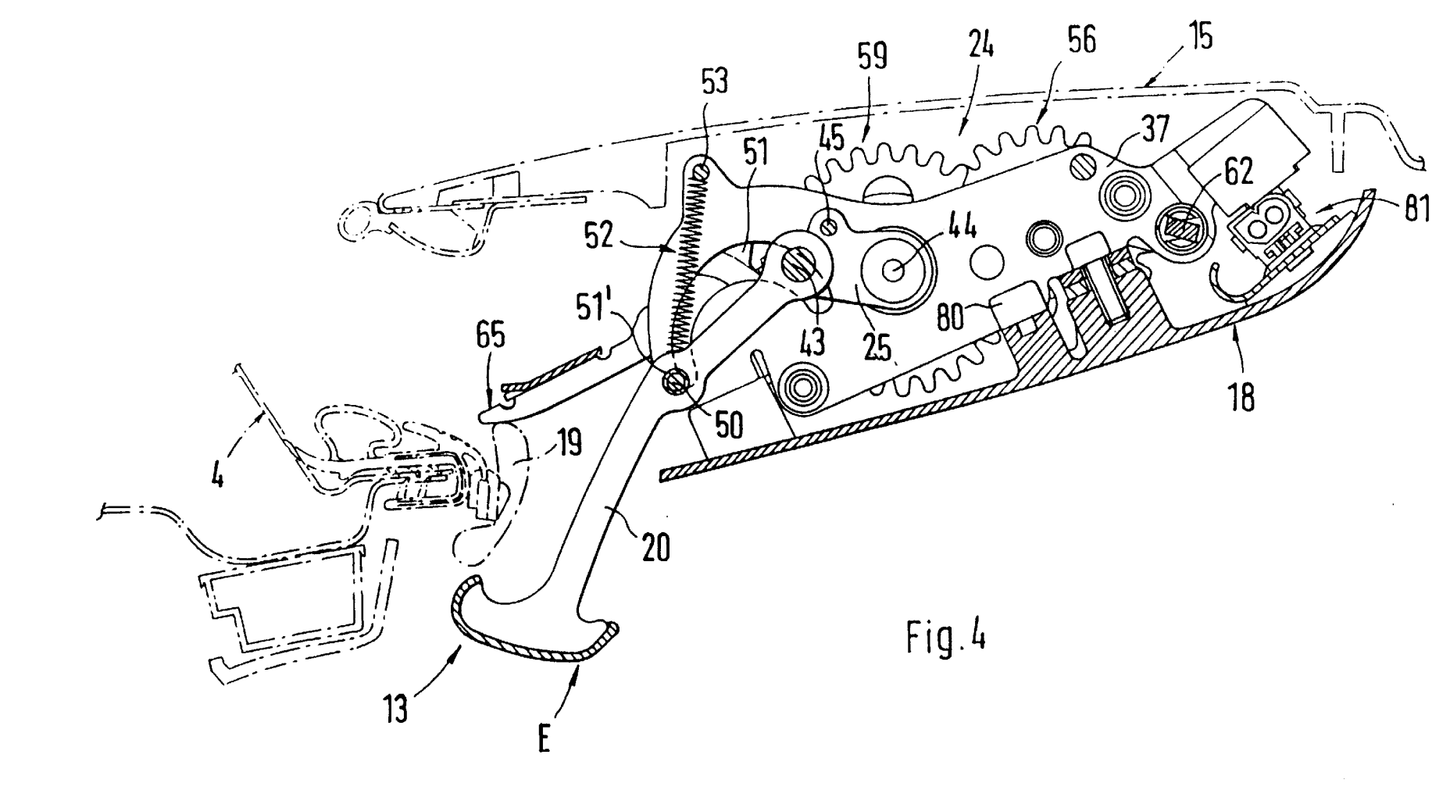
FIG. 4 is a sectional view along line IV—IV in FIG. 3, with the latching hook in its open position.
Figure 5:
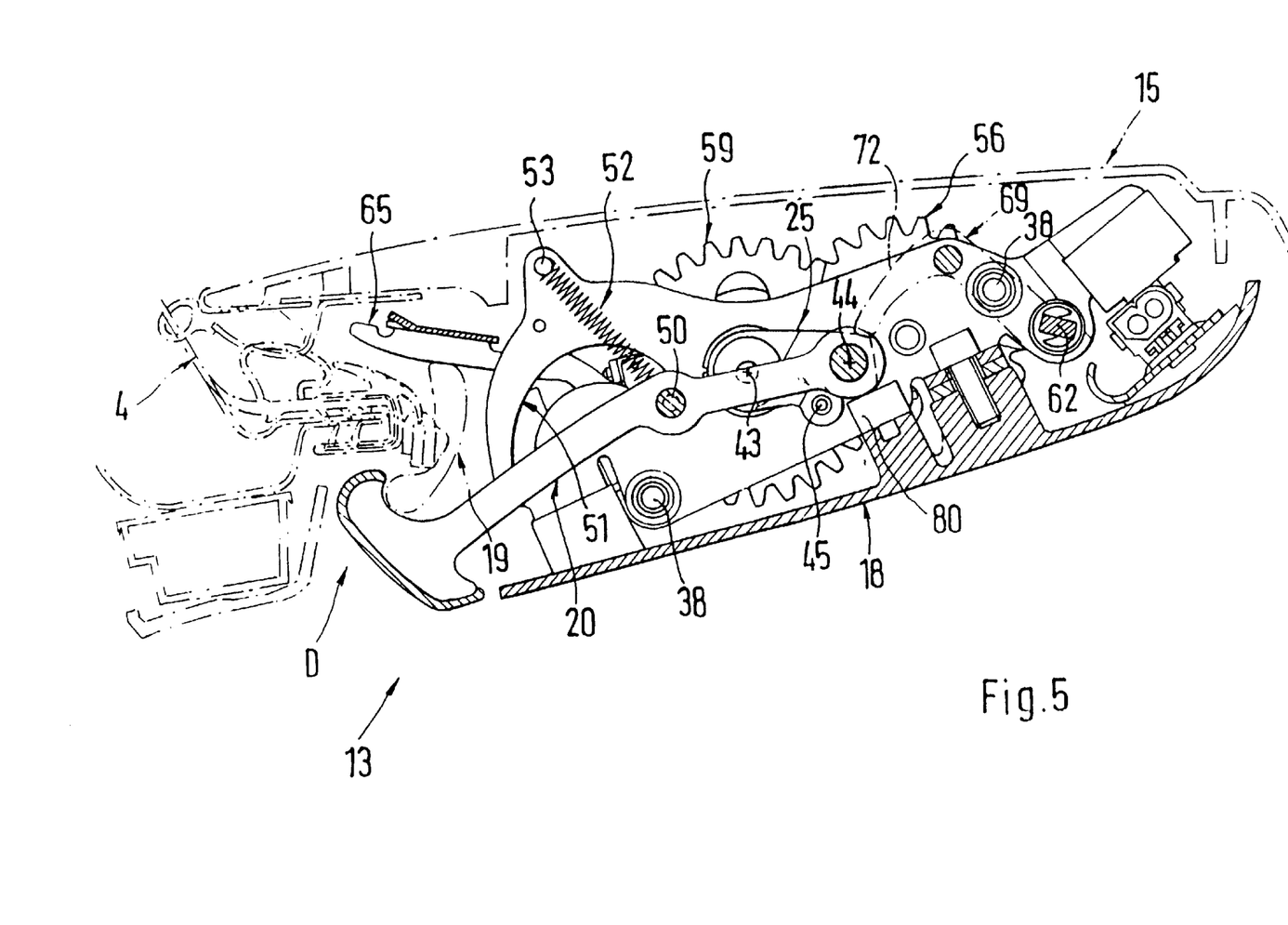
FIG. 5 is a sectional view along line V—V in FIG. 3, with the latching hook in its closed position.
Figure 6:
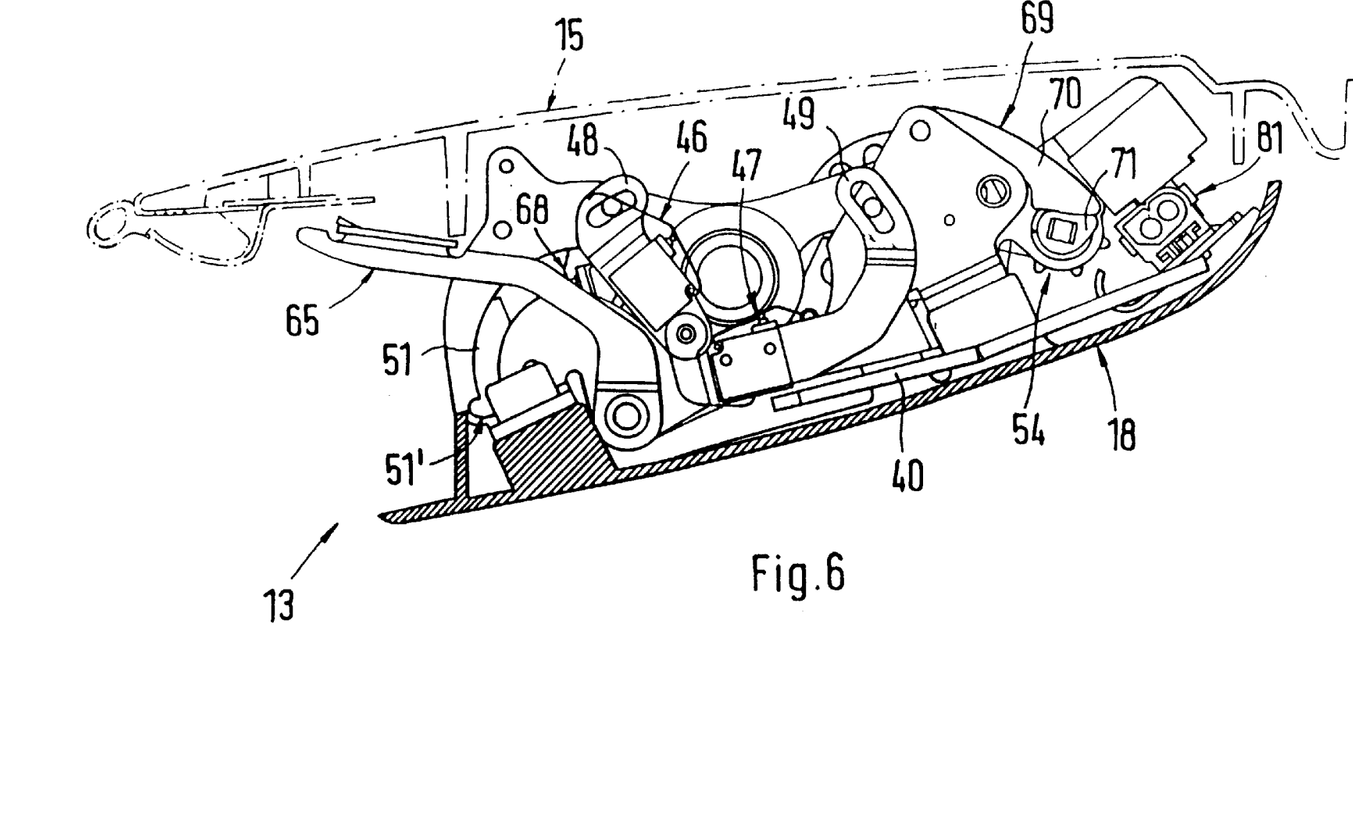
FIG. 6 is a sectional view along line IV—IV in FIG. 3.

End position switches 46, 47 are mounted on support panels 48, 49 which are screwed to bearing block 36. Elongated slot openings are provided in the support panels 48, 49 for allowing screws to pass through ensure adjustability of end position switches 46, 47 during assembly as seen in FIG. 6. The end position switch 46 is associated with monitoring contact 27 and is actuated when the latching hook 20 is in its unlocking position E (FIG. 4). The other end position switch 47 forms monitoring contact 28 and is actuated by the switch pin 45 when the latching hook 20 assumes its locking position D (FIG. 5).

The latching hook 20, at a distance from its articulated connection with drive levers 25, 25', has at least one laterally projecting guide pin 50, in an operating relationship with a link path 51 formed on adjoining bearing block 36 or 37 as seen in FIG. 4. At the lower, front edge of the link path 51, an endwise catch 51' is provided which is engaged by guide pin 50 in the unlocking position E of latching hook 20.

In the embodiment, transverse guide pin 50 extends on both sides of the elongated latching hook 20, with the projecting free ends of guide pin 50 engaging link paths 51 of the associated bearing blocks 36, 37. Both projecting guide pins 50 are connected by spring elements 52 with an upper cross pin 53 which connects the two bearing blocks 36, 37 so that latching hook 20 is achieved under spring tension. While the drive motor 22 is located on one side of the spaced bearing blocks 36, 37, the transmission 24 is provided on the other side of the bearing blocks 36, 37.

To obtain a high transmission ratio, the transmission 24 is formed by a two-stage spur-gear transmission. The first externally located stage of the spur-gear transmission includes a spur gear 54 permanently connected with transverse transmission element 23, said and meshed with a gear 56 mounted on an intermediate shaft 55. The gear 56 has a larger outside diameter and a larger number of teeth than the small pinion gear 54. Another fixed drive pinion 57 is also mounted on the intermediate shaft 55 and drives a larger gear 59 mounted on a drive shaft 58 which is being permanently connected to the drive lever 25.

The drive pinion 57 and the gear 59 of the second stage are rotatably mounted on the bearing block 37 facing away from the drive motor 22 and on an outer bearing plate 60. The bearing plate 60 which extends approximately parallel to the bearing blocks 36, 37 is connected by transverse spacing elements 61 to the bearing block 37. The pinion 54 mounted on the transmission element 23 and the gear 56 meshing therewith extend laterally outside the bearing plate 60. The transverse transmission element 23 is formed by two drive segments 62, 63 abutting one another in the transverse direction and being connected with each other by a plug-in clutch 64.

The plug-in clutch 64 allows the drive segment 63 carrying the pinion 54 to move through a fixed angle relative to the other drive segment 62. The rod-shaped, approximately rectangular drive segment 62 has one of its ends inserted into a matching opening in the worm drive 42, and the other end of the drive segment 62 engages an endwise fork-shaped recess in the other shaft-shaped drive segment 63.

Figure 9:
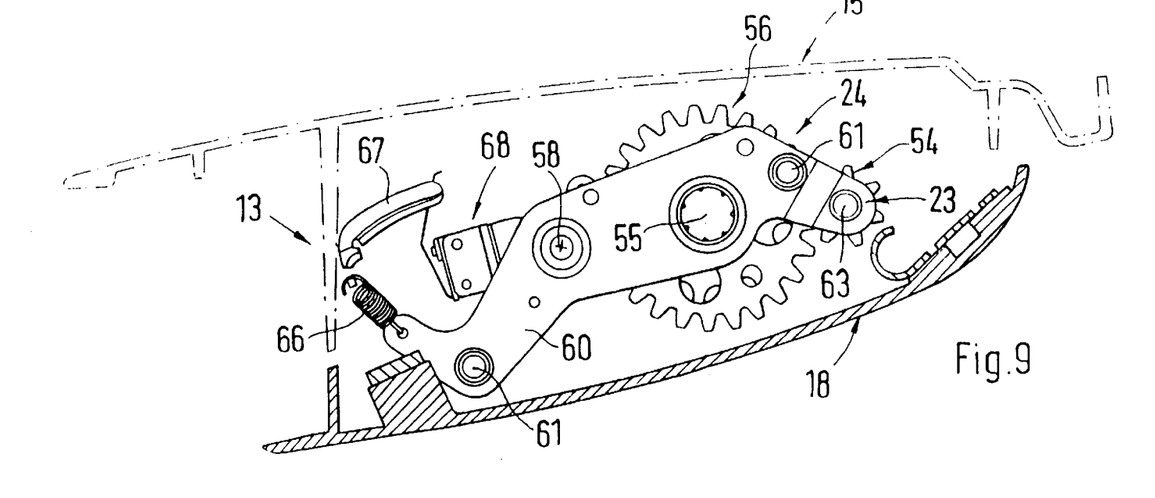
FIG. 9 is a sectional view along line IX—IX in FIG. 3.

On the outsides of the two spaced bearing blocks 36, 37, a feeler 65 is pivotably mounted above the latching hook 20, and is pulled downward by a tension spring 66. When the forward top section 15 is moved into the closing position, the feeler 65 comes in contact with the link 19 located therebeneath and is pushed upward against the force of the spring. As a result, a laterally spaced leg 67 of the feeler 65 actuates a position switch 68 as seen in FIG. 9, screwed to the outside of the bearing plate. A position switch 68 is associated with the monitoring contact 29. The feeler 65 can advantageously also be used for other top latch configuration and signals that the top 3 is at the front and therefore the closing process can begin.

A spring-loaded locking pawl 69 is rotatably mounted on the bearing block 36 which supports the two end position switches 46, 47. The rearwardly directed arm 70 of the locking pawl 69. is in an operating relationship endwise with a cam 71 of the transmission element 23 as seen in FIG. 6. The free end of the arm 72 which projects forward in locking position D of the latching hook 20 engages and blocks the driver lever 25' from above it, thereby providing additional protection of the latching hook 20 against vibration, twisting, or the like as seen in FIG. 5.

With reference to FIG. 4, a plug 81 of the electrical supply leads can be connected with the housing. Manual emergency operation 5 of the latch 13 is achieved by the fact that gear 56 of the first transmission stage rests on an axially displaceable supporting part 73 which is pressed outward by a compression spring 74 against an endwise disk 75 permanently attached to the intermediate shaft 55. Under the force of the compression spring 74, projecting pins 76 in the disk 75 engage matching recesses 77 in the supporting part 73.

When an auxiliary tool is inserted into the radially laterally open recesses 78 in the disk 75, the supporting part 73 is moved axially inwardly against the force of the compression spring 74 together with the gear 56, and a mechanical decoupling of the supporting part 73 from the disk 75 takes place. Manual rotary movement of disk 75 with the auxiliary tool drives the intermediate shaft 55 and hence the drive pinion 57 mounted thereon. The drive pinion 57 drives the gear 59 on the drive shaft 58 so that, as a result of the rotary movement of the gear 59, the drive lever 25 is pivoted as well. The latter, in turn moves the latching hook 20 of the latch 13 into the desired position. With an axial displacement of the supporting part 73, a spring-loaded unlocking pin 79 which abuts the interior of the gear 56 is moved in the transverse direction, namely in the direction of the drive motor 22; so that the locking pawl 69 is disengaged from the cam 71. Emergency actuation 35 (FIG. 10) is possible only when the locking pawl 69 is unlocked.

With the top 3 locked as seen in FIG. 5, the latching hook 20 assumes the locking position D which is beyond top dead center. The forward end of the latching hook 20 fits behind the link 19 (dot-dash lines). The guide pin 50 is located at the rear end of the link paths 51, and the rear end of the latching hook 20 abuts a stop 80 of housing 18 located therebeneath. The rear end position of drive levers 25, 25' is shown in FIG. 5. The switch pin 45 actuates the end position switch 47. The locking pawl 69 presses from above against the drive lever 25', thereby blocking the latching hook 20.

To open the latch 13, an actuating switch 30 in the passenger compartment is pressed and the drive motor 22 is operated by control device 26. The transmission element 23 performs a rotary counterclockwise movement which is transmitted through the transmission 24 to the drive lever 25, which is likewise pivoted forward counterclockwise. The guide pin of the latching hook 20 moves along the link paths 51 into the endwise catch 51'. Shortly before reaching this end position, the switch pin 45 actuates the end position switch 46. The unlocking position E of the latching hook 20 is shown in FIG. 4. During locking, the drive motor 22 causes the transmission element 23 to perform a rotary clockwise movement.

The actuation of the locking device 11 is described with reference to FIG. 12 for actuation of the motorized actuating device. The central control device 26 receives signals from the monitoring contacts 27 to 29 as well as from the actuating switch 30, and controls the motorized actuating device 21 to unlock or lock the locking device 11. The opening or closing process for the top 3 is performed by the actuating switch 30, which is usually configured as an actuating switch in the vehicle interior. Of course, other actuating devices in lieu of actuating switch 30 are contemplated, so that, for example remote operation by radio or an opening or closing signal for the top 2 can be obtained from a central locking system of the automobile 1.

The first monitoring contact 27 delivers a signal when the latching hook 20 assumes its locking position D. The second monitoring contact 28 delivers a signal when the latching hook 20 assumes its unlocking position E. The third monitoring contact 29 delivers a signal when the forward part of the top 15 and hence the feeler 65 has lifted off the link 19.

The control device 26 controls an opening process in the following manner. When the actuating switch 30 is pressed in the "open" direction, the motorized actuating device 21 is controlled to unlock the latching hook 20. As soon as the first monitoring contact 27 no longer delivers a signal, thus indicating that the latch is no longer locked, an opening movement of the top storage compartment lid 7 is initiated. The control device 26 continues to control the motorized actuating device 21 to unlock the latching hook 20 until a signal from the second monitoring contact 28 indicates that the latch is unlocked. In response to this signal, the top 3 can be opened in a known manner. During the opening movement, the control device 26 controls the motorized actuating device 21 to unlock the latching hook 20 so that the hook assumes its locking position D when the top 2 is deployed into its open position. The reaching of the locking position D, and hence the end of the control of the motorized actuating device 21, is indicated by the first monitoring contact 27.

To close the top 3, the actuating switch 30 is pushed in the "close" direction. The top 3 is then moved out in a manner known from its open position. During the closing movement of the top 3, the control device controls the motorized actuating device 21 to unlock the latching hook 20 until the second monitoring contact 28 indicates that the unlocked position E of the latching hook 20 has been reached. During the closing process of the top 3, a signal from third monitoring contact 29 indicates that the top has been raised. As soon as this signal is no longer present, the control device 26 controls the motorized actuating device 21 to lock the latching hook 20 until a signal from the first monitoring contact 27 indicates that the latching hook 20 has reached its locking position D. The closing process of the top 3 including the locking process of the locking device 11 is completed with this step.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle having a latch arrangement for a vehicle top, which latch arrangement is tensionable against a fixed vehicle body frame, the latch arrangement comprising a housing on the vehicle top which has a movable latching hook configured to cooperate with a link mounted on the fixed vehicle body frame and to be displaceable from a closed position into an open position, the latching hook having a length extending in a longitudinal direction of the vehicle and a drive motor aligned approximately parallel to opposed side faces of the latching hook, and operatively associated, through a transmission element extending transversely to the longitudinal direction, and a downstream spur gear transmission arranged parallel to opposed side faces of the latching hook, with a drive lever configured and arranged to move the latching hook whereby the latching hook, the drive motor, and the downstream transmission are spaced from each other in a direction transverse to the longitudinal direction so as to be parallel and approximately aligned.

2. Latch according to claim 1, wherein the housing is screwed by fastening screws from below against a dimensionally stable front top frame, the fastening screws being concealed from a passenger compartment by plastic covers which are configured to be clipped at the housing.

3. Vehicle according to claim 2, wherein elongate slot openings are formed in the housing adjacent receptacles for the fastening screws for allowing, with the plastic covers in an unclipped position, an auxiliary tool to be insertable for manual emergency operation of the latch.

4. Vehicle according to claim 1, wherein two spaced bearing blocks operatively arranged at a top of the housing are held in position with respect to one another by locally provided spacing elements, with one end of the associated drive lever being rotatably mounted on the bearing blocks and with another end of the drive lever being articulated with the latching hook.

5. Vehicle according to claim 1, wherein a transverse shift pin is mounted on the associated drive lever, with one freely projecting end of the shift pin, depending on an end position of the latching hook, cooperating with an associated end position switch.

6. Vehicle according to claim 4, wherein the drive motor is located on one side of the spaced bearing blocks and the downstream transmission is located on another side of the spaced bearing blocks.

7. Vehicle according to claim 1, wherein the transverse transmission element comprises two drive segments connected with one another by a plug-in clutch.

8. Vehicle according to claim 1, wherein the downstream transmission is a two-stage spur-gear drive.

9. Vehicle according to claim 8, wherein a first stage of the spur-gear drive is a pinion mounted on the transverse transmission element, and arranged to mesh with a gear mounted on an intermediate shaft.

10. Vehicle according to claim 8, wherein a second stage of the spur gear drive is formed by a drive pinion mounted on an intermediate shaft and is arranged to drive a gear mounted on a drive shaft which is permanently attached to the associated drive lever.

11. Vehicle according to claim 4, wherein the latching hook has, at a distance from its articulation point with the drive lever, at least one laterally projecting guide pin which is in an operative relationship at a free end thereof with a link path formed in an adjacent one of the bearing blocks.

12. Vehicle according to claim 11, wherein the guide pin is connected by at least one spring element with an upper cross pin connecting the two bearing blocks.

13. Latch according to claim 4, wherein a spring-loaded feeler is pivotably mounted on the bearing blocks and is, when the top is moved to a closed position, arranged to strike the link mounted on the frame to be pivoted upward thereby, and an offset leg of the feeler is configured to actuate a position switch.

14. Vehicle according to claim 8, wherein a gear of the first drive stage rests on a supporting part which is configured to be pressed by a compression spring against a disk located endwise and is permanently connected with an intermediate shaft, with projecting pins on the disk arranged to engage matching recesses in the supporting part and, when an auxiliary tool is inserted into radial recesses of the disk, the supporting part together with the gear is operatively arranged to be moved away axially from the disk and, by manual rotary movement of disk by the auxiliary tool, the latching hook is operatively arranged to be moved into a desired position.

15. Vehicle according to claim 14, wherein, with the supporting part and the gear in an axially moved position, a transverse unlocking pin is movable in the transverse direction such that a spring-loaded locking pawl is disengaged from a cam of the transverse transmission element.

* * * * *